(12) United States Patent
Hu et al.

(10) Patent No.: US 8,594,094 B2
(45) Date of Patent: Nov. 26, 2013

(54) MECHANISMS FOR DATA HANDLING DURING A RELAY HANDOVER WITH S1 TERMINATION AT EVOLVED UNIVERSAL TERRESTRIAL RADIO ACCESS NETWORK ACCESS NODE

(75) Inventors: Rose Qingyang Hu, Irving, TX (US); Yi Yu, Irving, TX (US); Zhijun Cai, Euless, TX (US); Mo-Han Fong, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 422 days.

(21) Appl. No.: 12/819,139

(22) Filed: Jun. 18, 2010

(65) Prior Publication Data

US 2010/0322194 A1 Dec. 23, 2010

Related U.S. Application Data

(60) Provisional application No. 61/218,905, filed on Jun. 19, 2009.

(51) Int. Cl.
*H04L 12/28* (2006.01)

(52) U.S. Cl.
USPC .......................... 370/392; 370/394; 370/400

(58) Field of Classification Search
USPC ............ 370/331, 394, 401; 455/428; 709/202
See application file for complete search history.

(56) References Cited

U.S. PATENT DOCUMENTS

| 2002/0078135 A1* | 6/2002 | Venkatsubra ................. 709/202 |
| 2007/0072604 A1* | 3/2007 | Wang ............................. 455/428 |
| 2007/0079207 A1 | 4/2007 | Seidel et al. |
| 2008/0112365 A1 | 5/2008 | Kwun et al. |
| 2008/0273537 A1* | 11/2008 | Meylan et al. ................. 370/394 |
| 2008/0307524 A1 | 12/2008 | Singh et al. |
| 2009/0168788 A1* | 7/2009 | Den et al. ........................ 370/401 |
| 2009/0196252 A1* | 8/2009 | Fischer .......................... 370/331 |
| 2010/0177739 A1 | 7/2010 | Huang |
| 2010/0265915 A1 | 10/2010 | Sun et al. |
| 2010/0322197 A1 | 12/2010 | Adjakple et al. |
| 2011/0002304 A1 | 1/2011 | Lee et al. |
| 2012/0033641 A1 | 2/2012 | Huang |
| 2012/0039302 A1 | 2/2012 | Chun et al. |

(Continued)

FOREIGN PATENT DOCUMENTS

| EP | 0986222 A2 | 3/2000 |
| EP | 1422883 A1 | 5/2004 |

(Continued)

OTHER PUBLICATIONS

3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.

(Continued)

*Primary Examiner* — Jung Park

(74) *Attorney, Agent, or Firm* — Conley Rose, P.C.; J. Robert Brown, Jr.

(57) ABSTRACT

An access node comprising at least one component configured to support forwarding of data packets to a user agent connected to a relay node, wherein the relay node is connected to the access node, and wherein the access node is a termination point for a first tunneling path from a core network.

12 Claims, 10 Drawing Sheets

(56) References Cited

U.S. PATENT DOCUMENTS

| | | | |
|---|---|---|---|
| 2012/0051349 | A1 | 3/2012 | Teyeb et al. |
| 2012/0142357 | A1 | 6/2012 | Aminaka |
| 2013/0058272 | A1* | 3/2013 | Adjakple et al. ............ 370/315 |

FOREIGN PATENT DOCUMENTS

| | | |
|---|---|---|
| EP | 1519519 A1 | 3/2005 |
| EP | 2184935 A1 | 5/2010 |
| WO | 2006090269 A1 | 8/2006 |
| WO | 2006138046 A2 | 12/2006 |
| WO | 2007092617 A2 | 8/2007 |

OTHER PUBLICATIONS

3GPP TS 36.300 v8.8.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Mar. 2009; 157 pgs.

3GPP TS 36.304 v8.5.0; 3rd Generation Partnership Project; Technical Specification Group Radio Access Network; Evolved Universal Terrestrial Radio Access (E-UTRA); User Equipment (UE) Procedures in Idle Mode; Release 8; Mar. 2009; 30 pgs.

3GPP TS 36.331 v8.5.0; 3rd Generation Partnership Project; Technical Specification Group Radio Access Network; Evolved Universal Terrestrial Radio Access (E-UTRA) Radio Resource Control (RRC); Protocol Specification; Release 8; Mar. 2009; 204 pgs.

QUALCOMM Europe; 3GPP TSG-RAN WG1 #54; Title: "Operation of Relays in LTE-A;" R1-083191; Jeju, S. Korea; Aug. 18-22, 2008; 5 pgs.

Motorola; TSG-RAN WG1 #54; Title: "Classification of Relays;" R1-083223; Jeju, South Korea; Aug. 18-22, 2008; 3 pgs.

Motorola; 3GPP TSG-RAN-WG2 Meeting #66; Title: "Handovers Involving Type-1 Relay Node;" R2-093207; San Francisco, US; May 4-8, 2009; 2 pgs.

NTT DOCOMO; 3GPP TSG-RAN2 #66; Title: "Relay Requirements & Use Case Study in LTE-Advanced;" R2-093281; San Francisco, US; May 4-8, 2009; 5 pgs.

NTT DOCOMO; 3GPP TSG-RAN2 #66; Title: "On S1 Termination and Protocol Stack in Relay Architecture;" R2-093283; San Francisco, US; May 4-8, 2009; 8 pgs.

Hu, Rose Qingyang, et al.; U.S. Appl. No. 12/819,138; Title "Mechanisms for Data Handling During a Relay Handover with S1 Termination at Relay"; Filing Date: Jun. 18, 2010.

Cai, Zhijun, et al.; U.S. Appl. No. 12/573,010; Title: "Handover Mechanisms with Synchronous PDCP Protocol Under Various Relay Architectures"; filed Oct. 2, 2009.

Cai, Zhijun, et al.; U.S. Appl. No. 12/573,015; Title: "Architecture for Termination at Access Device"; filed Oct. 2, 2009.

Cai, Zhijun, et al.; U.S. Appl. No. 12/573,014; Title: "System and Method for Handover Between Relays"; filed Oct. 2, 2009.

Foreign Communication from Counterpart Application; Application No. 10184837.2-1249; EESR mailed Nov. 30, 2010; 7 pgs.

Foreign Communication from Counterpart Application; Application No. 10184900.8-1249; EESR mailed Dec. 6, 2010; 7 pgs.

Foreign Communication from Counterpart Application; Application No. 10184508.9-1249; EESR mailed Dec. 6, 2010; 7 pgs.

3GPP TR 36.912v0.2.0; 3rd Generation Partnership Project; Technical Specification Group Radio Access Network; Feasibility Study for Further Advancements for E-UTRA (LTE-Advanced); Release 9; Aug. 2009; 31 pgs.

3GPP TS 36.331v9.0.0; 3rd Generation Partnership Project; Technical Specification Group Radio Access Network; Evolved Universal Terrestrial Radio Access (E-UTRA) Radio Resource Control (RRC); Protocol Specification; Release 9; Sep. 2009; 213 pgs.

Ericsson; Title: Termination of the S1/X2 Interfaces in Relay Node; R2-092953; 3GPP TSG-RAN WG2 #66; San Francisco, USA; May 4-8, 2009; 4 pgs.

NTT DOCOMO, Inc.; Title: Report of email discussion [66#22] on Relay Architecture; R2-093972; 3GPP TSG-RAN WG2 #66bis; Los Angeles, USA; Jun. 29-Jul. 3, 2009; 30 pgs.

NTT DOCOMO; 3GPP TSG-RAN3 #64; Title: "Relay Requirements & Use Case Study in LTE-Advanced;" R3-091228; San Francisco, USA; May 4-8, 2009; 5 pgs.

Panasonic; 3GPP TSG RAN WG1 Meeting #54; Title: "Discussion on the Various Types of Relays;" R1-082397; Warsaw, Poland; Jun. 30-Jul. 4, 2008; 6 pgs.

PCT International Search Report; PCT Application No. PCT/US2010/039236; mailed Aug. 26, 2010; 3 pgs.

PCT Written Opinion of the International Searching Authority; PCT Application No. PCT/US2010/039236; mailed Aug. 26, 2010; 6 pgs.

PCT International Search Report; PCT Application No. PCT/US2010/039257; mailed Aug. 25, 2010; 3 pgs.

PCT Written Opinion of the International Searching Authority; PCT/US2010/039257; mailed Aug. 25, 2010; 4 pgs.

RAN3 LTE-A Rapporteur; 3GPP TSG RAN WG3 Meeting #64; Title: "LTE-A RAN3 Baseline Document;" R3-091447; San Francisco, USA; May 4-8, 2009; 12 pgs.

Texas Instruments; 3GPP TSG RAN WG2 #66; Title: "On the Design of Relay Node for LTE-Advanced;" R2-093064; San Francisco, USA; May 4-8, 2009; 4 pgs.

Office Action dated Apr. 11, 2012; U.S. Appl. No. 12/573,010, filed Oct. 2, 2009; 28 pages.

Office Action dated Jun. 29, 2012; U.S. Appl. No. 12/573,014, filed Oct. 2, 2009; 34 pages.

Office Action dated Oct. 1, 2012; U.S. Appl. No. 12/819,138, filed Jun. 18, 2010; 25 pages.

Office Action dated Aug. 22, 2012; U.S. Appl. No. 12/573,015, filed Oct. 2, 2009; 28 pages.

European Examination Report; Application No. 10732550.8; Oct. 26, 2012; 3 pages.

Notice of Allowance dated Nov. 28, 2012; U.S. Appl. No. 12/573,010, filed Oct. 2, 2009; 23 pages.

Parkvall, Stefan, et al.; "LTE-Advanced—Evolved LTE Towards IMT-Advanced"; IEEE; 2008; 5 pages.

Final Office Action dated Mar. 27, 2013; U.S. Appl. No. 12/819,138, filed Jun. 18, 2010; 28 pages.

Office Action dated May 2, 2013; U.S. Appl. No. 12/573,015, filed Oct. 2, 2009; 34 pages.

Office Action dated May 1, 2013; U.S. Appl. No. 12/573,014, filed Oct. 2, 2009; 43 pages.

Canadian Office Action; Application No. 2,716,296; Mar. 21, 2013; 3 pages.

Canadian Office Action; Application No. 2,716,090; Mar. 20, 2013; 3 pages.

Canadian Office Action; Application No. 2,716,295; Mar. 21, 2013; 3 pages.

European Examination Report; Application No. 10184508.9; Feb. 11, 2013; 3 pages.

Office Action dated Jun. 11, 2013; U.S. Appl. No. 12/819,138, filed Jun. 18, 2010; 24 pages.

* cited by examiner

MECHANISMS FOR DATA HANDLING DURING A RELAY HANDOVER WITH S1 TERMINATION AT EVOLVED UNIVERSAL TERRESTRIAL RADIO ACCESS NETWORK ACCESS NODE

CROSS-REFERENCE TO RELATED APPLICATIONS

The present application claims priority to U.S. provisional patent application No. 61/218,905 filed Jun. 19, 2009, by Rose Qingyang Hu, et al, entitled "Mechanisms for Data Handling During a Relay Handover with S1 Termination at Evolved Universal Terrestrial Radio Access Network Access Node" (35785-US-PRV-4214-18700), which is incorporated by reference herein as if reproduced in its entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "user entity," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE) or LTE-Advanced (LTE-A). For example, an LTE or LTE-A system might include an Evolved Universal Terrestrial Radio Access Network (E-UTRAN) node B (eNB), a wireless access point, or a similar component rather than a traditional base station. As used herein, the term "access node" will refer to any component of the wireless network, such as a traditional base station, a wireless access point, or an eNB, that creates a geographical area of reception and transmission coverage allowing a UA or a relay node to access other components in a telecommunications system. In this document, the term "access node" and "access device" may be used interchangeably, but it is understood that an access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may used serially to extend or enhance coverage created by an access node.

An LTE or LTE-A system can include protocols such as a Radio Resource Control (RRC) protocol, which is responsible for the assignment, configuration, and release of radio resources between a UA and a network node or other equipment. The RRC protocol is described in detail in the Third Generation Partnership Project (3GPP) Technical Specification (TS) 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network nodes with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods and systems for supporting relay handover for a UA in communication with an access node via a relay node, where a S1 path associated with the UA is terminated at the access node. Specifically, a relay handover may be performed for one of a plurality of UA mobility scenarios, where the UA may be reassigned from a first relay node to a second relay node or an access node and a S1 path switch is performed. To improve the relay handover, one of a plurality of schemes may be used, including using synchronous Packet Data Convergence Protocol (PDCP) Sequence Numbers (SNs) for interfaces between the access node, relay node, and UA and further sending PDCP status report from the relay node to the access node. The relay handover schemes may also include early termination of access node relay transmissions.

Figure 1:
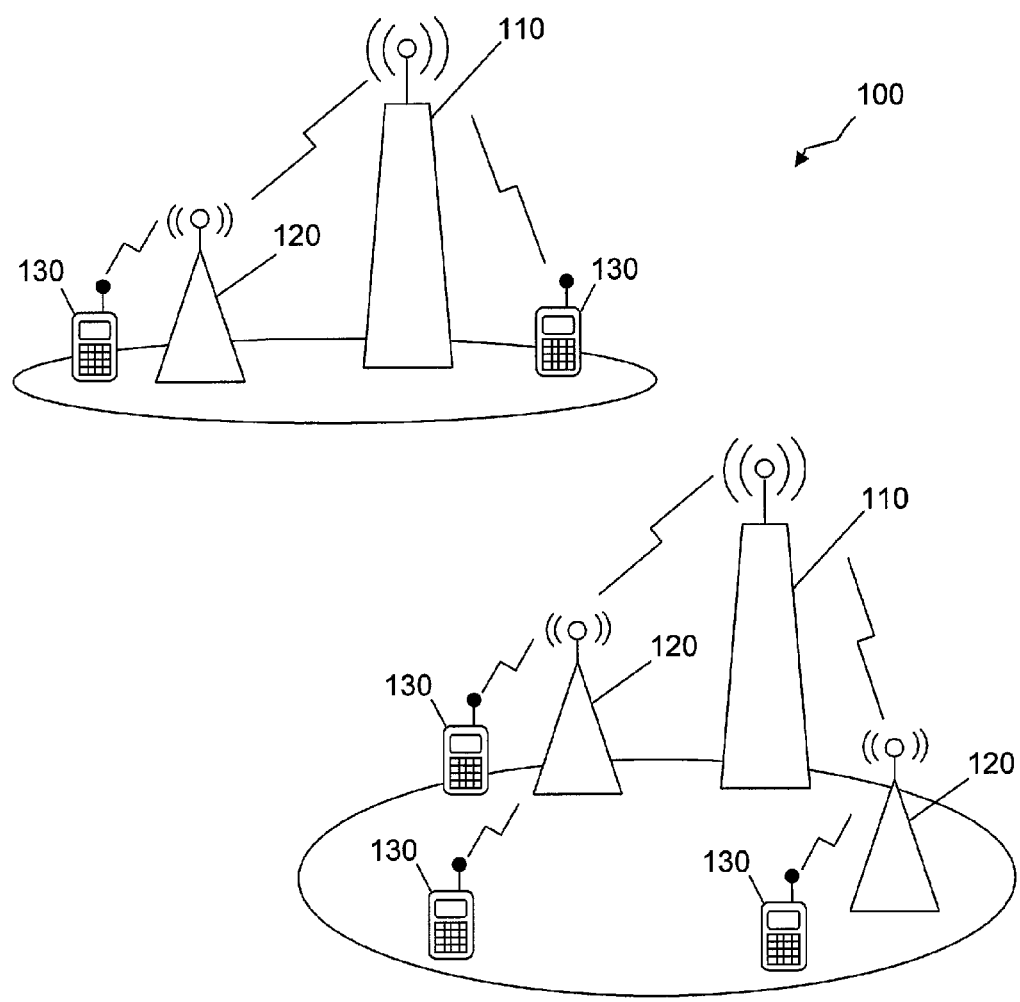
FIG. 1 is a diagram illustrating a radio access network according to an embodiment of the disclosure.

FIG. 1 illustrates an embodiment of a radio access network (RAN) 100, which may be a LTE or LTE-A network as described in the 3GPP. FIG. 1 is exemplary and may have other components or arrangements in other embodiments. In an embodiment, the RAN 100 may comprise at least one access device 110, at least one relay node (RN) 120, and at least one UA 130. The access devices 110 may be an ENB, a base station, or other components that promote network access for the UAs 130. The access devices 110, such as a "donor" ENB (DENB), may communicate with any UA 130, which may be within the same cell, directly via a direct link. A cell may be a geographical area of reception and transmission coverage. For instance, the direct link may be a point-to-point link established between the access device 110 and the UA 130 and used to transmit and receive signals between the two. The access devices 110 may communicate with at least some of the RNs 120, which may be in the same cell, via relay links or with other access devices 110. Additionally, the access devices 110 may communicate with other components or devices to provide for the components of the RAN 100 access to other networks, for instance using similar or different network protocols or technologies.

The RNs 120 may communicate with any UA 130 within the same cell via access links and with the access devices 110 via relay links to establish indirect communications between the UAs 130 and the access devices 110. For instance, the access link may be a point-to-point link established to exchange signals between an RN 120 and a UA 130 and the relay link may be a point-to-point link established to exchange signals between the RN 120 and the access device 110. Further, the UAs 130 may be moved due to handover between the cells corresponding to different access devices 110 or RNs 120. Hence, the UAs 130 may establish communications with the access devices 110 via direct links or with different RNs 120 via access links. Further, the UAs 130 may communicate with one another using the direct links established with the access device 110 or using the access links established with the RNs 120 and the relay links between the RNs 120 and the access devices 110.

The RNs 120 may be used to enhance coverage within or near a cell, or to extend the size of coverage of a cell. Additionally, the use of a relay node 120 can enhance throughput of a signal within a cell because the UA 130 can access the relay node 120 at a higher data rate or a lower power transmission than what the UA 130 might use when communicating directly with the access node 110 for that cell. Transmission at a higher data rate using the same amount of bandwidth creates higher spectrum efficiency and lower power benefits for the UA 130 by consuming less battery power and causing less overall interference on the uplink.

The RNs 120 may relay the signals between the UAs 130 and the access node 110 using frequency-division duplexing (FDD), where signals are received and transmitted at different frequencies. As such, the RNs 120 may receive and transmit signals at about the same time with reduced signal interference between the received and transmitted signals. However, transmitting and receiving the signals to the UAs 130 and the access nodes 110 at about the same time may be difficult due to technical challenges related to the transmitters, receivers, or transceivers at the RNs 120. Hence, the RNs may relay the signals to the UAs 130 and the access nodes 110 using time-division duplexing (TDD), where the signals may be transmitted and received at different transmission time intervals (TTIs).

The RNs 120 may comprise at least one of three types of devices, Layer One (L1) relays, Layer (L2) relays, and Layer Three (L3) Relays. The L1 relays may be repeaters that receive and retransmit signals (without demodulation/decoding of the signals) between the UAs 130 and the access devices 110. The L2 relays may receive and transmit the signals, for instance using TDD and/or FDD. The L2 relays may demodulate the received signals and modulate the signals before retransmission, for instance based on radio conditions, to improve transmission reliability. Additionally, the L2 relays may use resource scheduling for transmitting and receiving the signals from the UAs 130 or the access devices 110. An L2 relay is similar to and may be referred to as a Type II relay. The L3 relays may be more robust devices with the capabilities of ENBs that are configured similar to the access devices 110 or comprise at least some of the functionalities of the access devices 110, such as radio resource management and resource scheduling. An L3 relay may also be referred to as a Type I relay.

The RNs 120 may also be Type One (Type I) relays, for example as described in 3GPP RAN1#56, which may communicate with the UA and the access node, such as ENB. The Type I relays may establish a separate cell from the access node and a Physical Cell ID associated with the cell, for instance as defined in LTE Release 8. The Type I relays may also transmit their own synchronization channels, reference symbols, etc. Additionally, the Type I relays may send to the UAs scheduling information and Hybrid Automatic Repeat Request (HARQ) feedback and may receive from the UAs control channels, e.g., scheduling request (SR), channel quality information (CQI), and acknowledgement (ACK). The Type I relays may appear as Release 8 ENBs for Release 8 UAs or may be configured different than the ENBs for LTE-A UAs.

Figure 2:
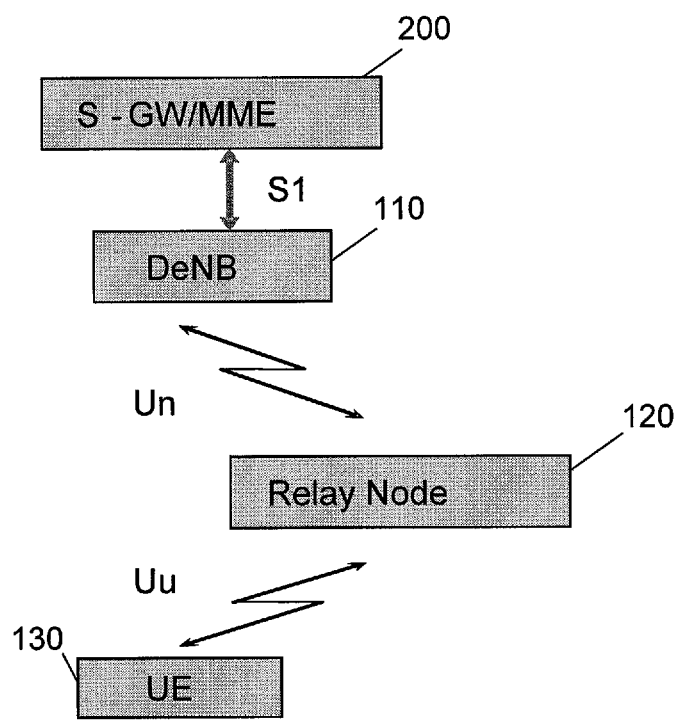
FIG. 2 is a diagram of a S1 path terminated at a relay node according to an embodiment of the disclosure.

FIG. 2 illustrates an embodiment of a S1 path terminated at the access node 110. For instance, the S1 path may be established between the access node 110 (e.g. a DENB) and a serving gateway (S-GW)/mobility management entity (MME) 200, which may be in communication with an external network. As such, the RN 120 and the access node 110 may forward communications between the UA 130 and the S-GW/MME 200, where packets may be directed or tunneled between the access node 110 and the S-GW/MME 200. Specifically, to exchange communications, the RN 120 may establish a Un interface with the access node 110 and a Uu interface with the UA 130. Specifically, the Un interface may be established to exchange communications between the access node 110 and the RN 120, while the Uu interface may be established to exchange communications between the RN 120 and the UA 130.

Figure 3:
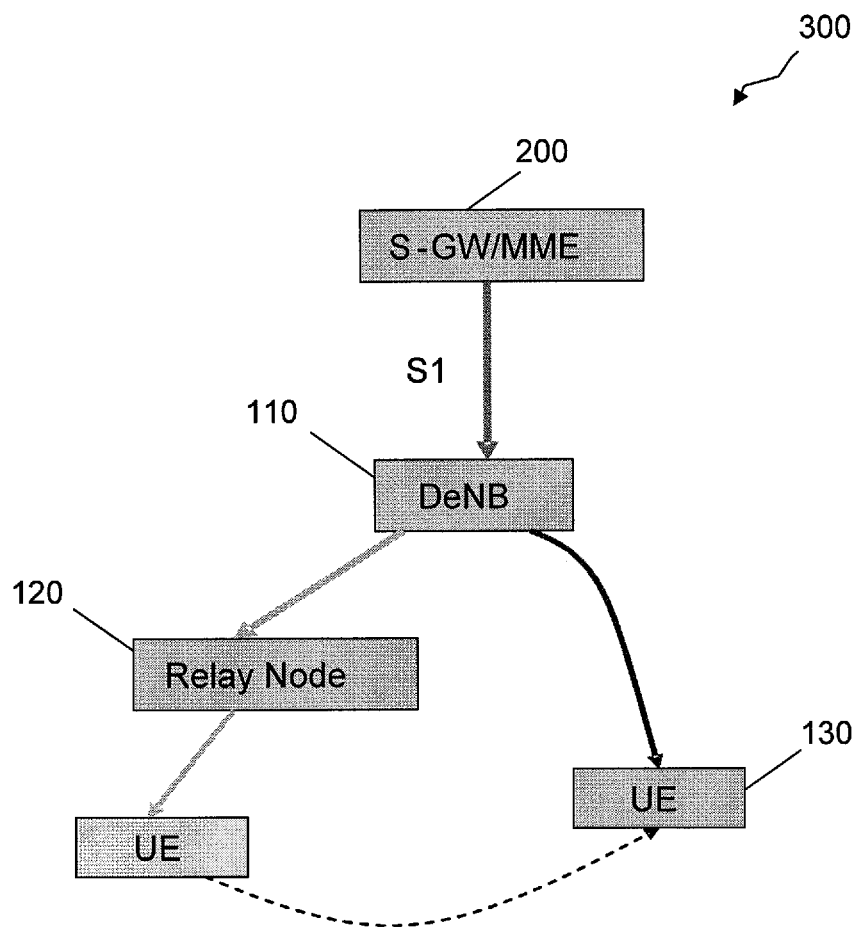
FIG. 3 is a diagram of a relay handover for a first UA mobility scenario according to an embodiment of the disclosure.

FIG. 3 illustrates an embodiment of a relay handover for a first UA mobility scenario 300, where a S1 path is terminated at an access node. Specifically, the UA 130 may be initially assigned to a RN 120 in communication with an access node 110. The UA 130 may be reassigned during the relay handover, for instance using a Release 8 handover procedure, from the RN 120 to the access node 110. During the handover, the RN 120 may need to forward data that have been previously received from the access node 110 back to the access node 110.

Typically, prior to establishing the relay handover, a plurality of Packet Data Convergence Protocol (PDCP) service data units (SDUs) may be transmitted, for instance using a Radio Link Control (RLC) protocol, over the Un interface from the access node 110 to the RN 120. At least some of the PDCP SDUs may not be completely transferred, such as in RLC-Unacknowledged Mode (RLC-UM), or may not be completely acknowledged by the RN 120, such as in RLC-Acknowledged Mode (RLC-AM). To avoid data loss or call drops, such PDCP SDUs may be returned to the access node 110 over the Un interface, for instance via an X2 interface protocol. The redirecting of the PDCP SDUs causes additional or redundant data forwarding during relay handover. Redundant data forwarding may increase packet loss and interruption time during communications and may also cause bandwidth inefficiency.

In an embodiment, the access node 110 may be configured to be aware of the PDCP SDUs and/or any data received by the UA 130, for instance using synchronous PDCP SNs and status report, as described in detail below. As such, in the handover procedure, the access node 110 may forward the data to the reassigned UA 130 without redundant data forwarding from the RN 120. Additionally or alternatively, the access node 110 may perform early termination of transmissions to the RN 120 to reduce redundant data forwarding.

Figure 4:
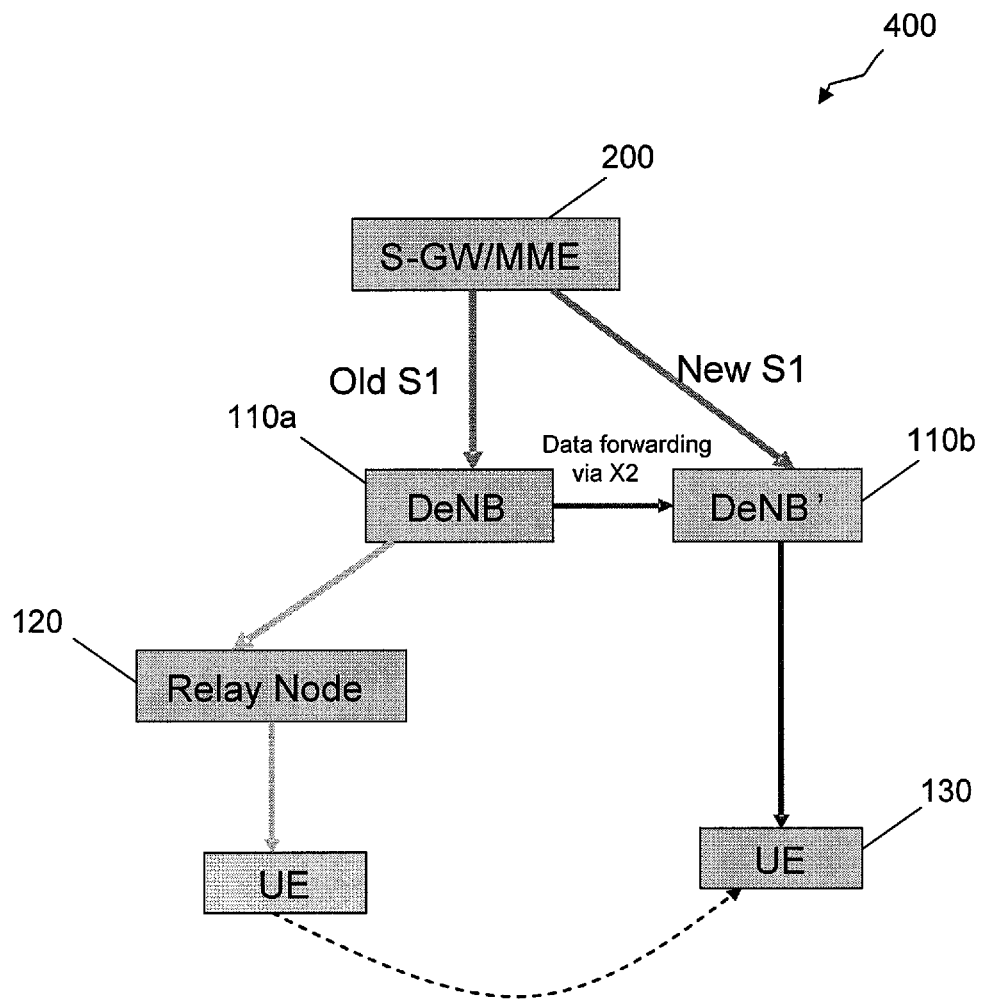
FIG. 4 is a diagram of a relay handover for a second UA mobility scenario according to an embodiment of the disclosure.

FIG. 4 illustrates an embodiment of a relay handover for a second UA mobility scenario 400, where an initial S1 path is terminated at an access node. Specifically, the UA 130 may be initially assigned to a RN 120 in communication with a first access node 110a, which may forward communications between the UA 130 and the S-GW/MME 200 along an initial or "old" S1 path. The UA 130 may then be reassigned during relay handover to a second access node 110b in communication with the S-GW/MME 200. Accordingly, a S1 path switch may be performed and a "new" S1 path may be terminated at the second access node 110b. Similar to the relay handover for the first UA mobility scenario 300, in the relay handover of the second UA mobility scenario 400, the first access node 110a may be configured to be aware of the data received by the UA 130 via the RN 120 in order to limit redundant data forwarding from the RN 120.

Figure 5:
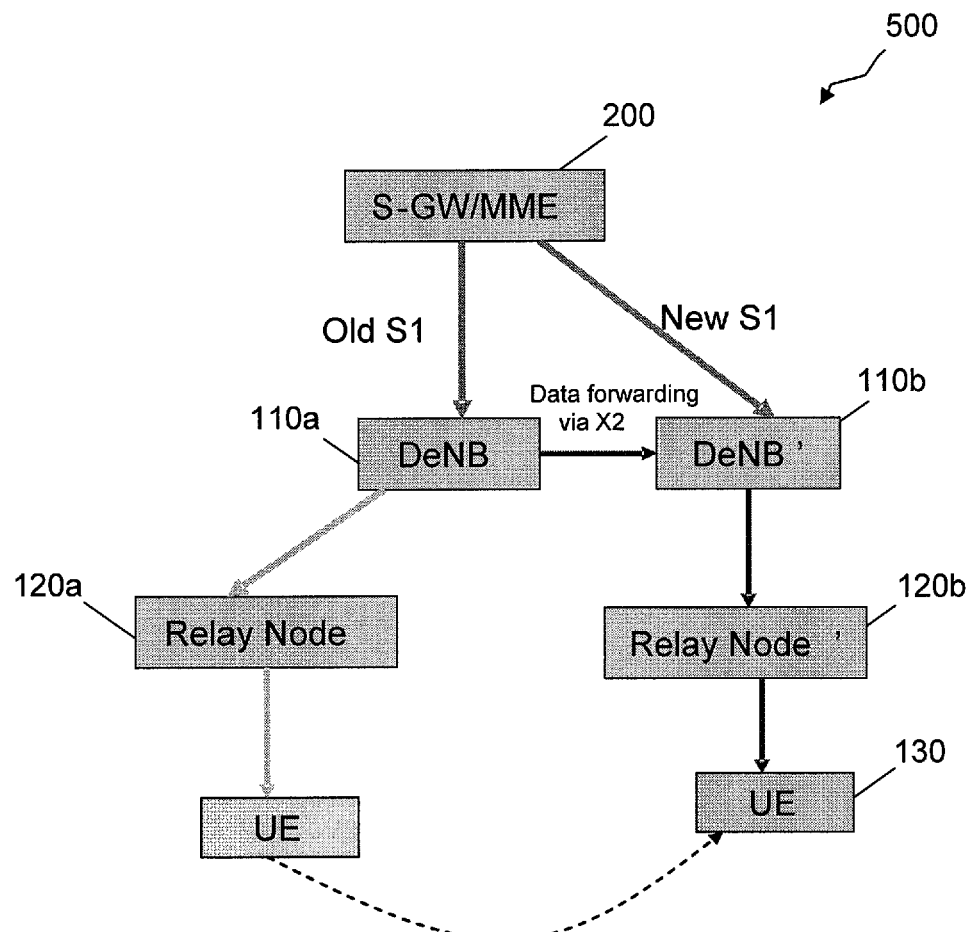
FIG. 5 is a diagram of a relay handover for a third UA mobility scenario according to an embodiment of the disclosure.

FIG. 5 illustrates an embodiment of a relay handover for a third UA mobility scenario 500, where an initial S1 path is terminated at an access node. Specifically, the UA 130 may be initially assigned to a first RN 120a in communication with a first access node 110a, which may forward communications between the UA 130 and the S-GW/MME 200 along an initial or old S1 path. The UA 130 may then be reassigned during relay handover to a second RN 120b in communication with a second access node 110b. Accordingly, a S1 path switch may be performed and a new S1 path may be terminated at the second access node 110b. Similar to the relay handovers for the first UA mobility scenario 300 and the second UA mobility scenario 400, the first access node 110a may be configured to be aware of the data received by the UA 130 via the RN 120 to limit redundant data forwarding.

Figure 6:
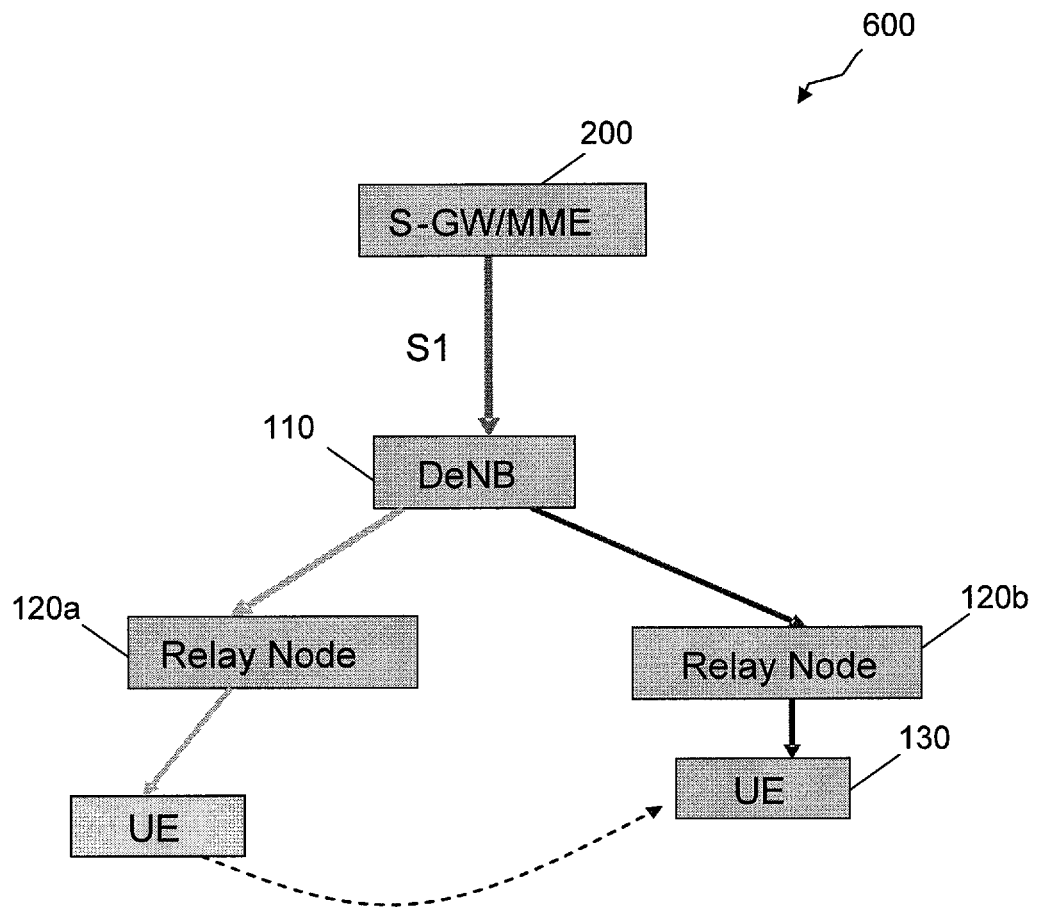
FIG. 6 is a diagram of a relay handover for a fourth UA mobility scenario according to an embodiment of the disclosure.

FIG. 6 illustrates an embodiment of a relay handover for a fourth UA mobility scenario 600, where a S1 path is terminated at an access node. Specifically, the UA 130 may be initially assigned to a first RN 120a in communication with an access node 110, which may forward communications between the UA 130 and the S-GW/MME 200 along the S1 path. The UA 130 may then be reassigned during relay handover to a second RN 120b in communication with the access node 110. Similar to the relay handovers for the UA mobility scenarios described above, the access node 110 may be configured to reduce data forwarding during the handover procedure, as described in detail below.

Figure 7:
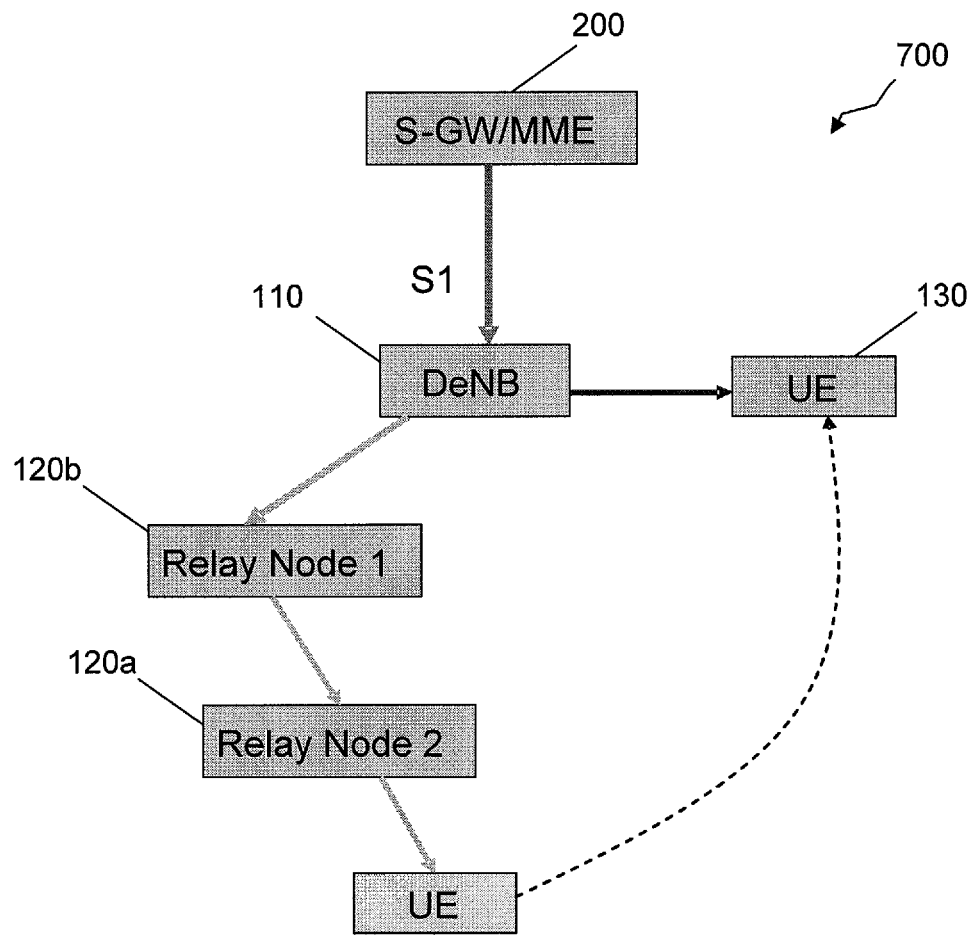
FIG. 7 is a diagram of a relay handover for a fifth UA mobility scenario according to an embodiment of the disclosure.

FIG. 7 illustrates an embodiment of a relay handover for a fifth UA mobility scenario 700, where a S1 path is terminated at an access node. Specifically, the UA 130 may be initially assigned to a first RN 120a in communication with an access node 110 via a second RN 120b. The access node 110 may forward communications, via the first RN 120a and the second RN 120b, between the UA 130 and the S-GW/MME 200 along the S1 path. The UA 130 may then be reassigned during relay handover to the access node 110 directly instead of the first RN 120a. Similar to the access nodes for the UA mobility scenarios above, the access node 110 may be configured to reduce data forwarding from the first RN 120 a and/or the second RN 120b.

Figure 8:
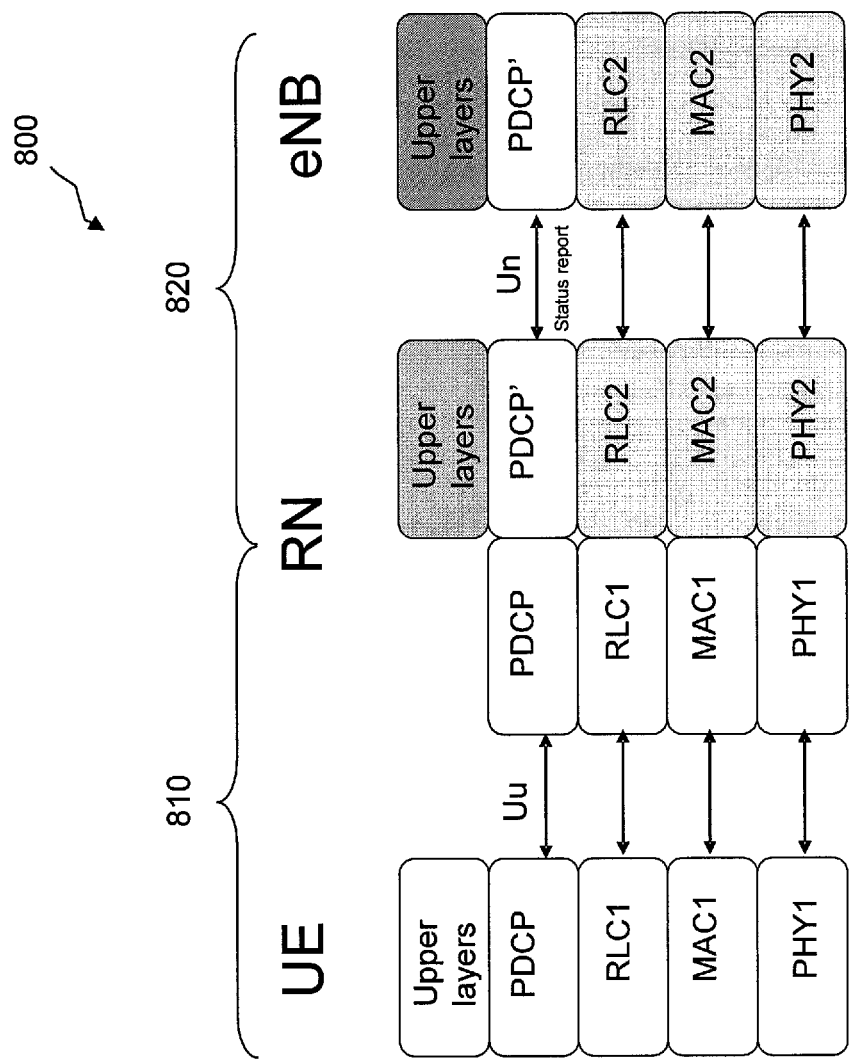
FIG. 8 is a protocol diagram for Uu and Un interfaces between an access node, a relay node, and a UA according to an embodiment of the disclosure.

FIG. 8 illustrates an embodiment of a protocol diagram 800 for Uu and Un interfaces between the access node 110, the relay node 120, and the UA 130. The protocol diagram may comprise a first protocol stack 810 on the Uu interface between the UA 130 and the RN 120 and a second protocol stack 820 on the Un interface between the Rn 120 and the access node 110, such as ENB. The first protocol stack 810 may comprise a first PDCP layer (PDCP), a first RLC layer (RLC1), a first Medium Access Control (MAC) layer (MAC1), and a first Physical layer (PHY1), in the order from upper layers to lower layers. The second protocol stack may comprise a plurality of one-to-one corresponding layers, i.e., a second PDCP layer (PDCP'), a second RLC layer (RLC2), a second Medium Access Control (MAC) layer (MAC2), and a second Physical layer (PHY2).

Typically, the data in the first protocol stack 810 and second protocol stack 820 may not be coordinated, such that two corresponding layers in the two protocol stacks, e.g., PDCP and PDCP', may require to exchange information in order to match different data between the two layers. For instance, the RN 120 may be aware of any received data as well as unreceived data by the UA 130 through the PDCP and RLC1. Similarly, the access node 110 may be aware of any received data as well as unreceived data by the RN 120 through the PDCP' and RLC2. However, the access node 110 may have no knowledge of the received data and unreceived data by the UA 130 through the PDCP and RLC1, which may cause redundant data handling during relay handover as described above.

In an embodiment, the access node 110 may be made aware of the received and unreceived data at the UA 130 by coordinating the data transferred over the Uu interface with data transferred over the Un interface. Specifically, the data associated with the PDCP and PDCP' may be coordinated using synchronous PDCP SNs. For instance, each radio bearer on the Un interface may be configured to carry a single UA radio bearer so that the PDCP and PDCP' may carry the same data bearer traffic. However, since lower layer transmissions, e.g., RLC, MAC, and PHY, may be different on Uu and Un interfaces, the PDCP and PDCP' may still have different SNs. For example, if some PDCP' Protocol Data Units (PDUs) are lost on the Un interface from the access node 110 to the RN 120, the RN 120 may have a gap in the received PDCP' SNs but continue to use continuous PDCP SNs to transmit PDCP PDUs to the UA 130.

If the PDCP' PDUs are received at the RN 120 from the access node 110 at the RLC layer in sequence, the PDCP' SNs may comprise a gap but the PDCP' SNs and PDCP SNs may remain synchronous. The gap may indicate the number of PDCP' PDUs lost at the Un interface. The RN 120 may use a variable PDCP_GAP_COUNTER to count the gap between the transmitted PDCP SN (or Next_PDCP_TX_SN) and the received PDCP' SN (or Next_PDCP_RX_SN). The count may be negative or positive for counting up or counting down the gap. For instance, the first bit of the PDCP-GAP_COUNTER may be used to indicate a negative or positive count. Further, to account for multiple gaps, a pair (PDCP_GAP_COUNTER, PDCP SN) may be used to indicate the location of each gap. For example, if the RN 120 receives the PDCP' SNs 1, 2, 4, 5, 6, 8, 9, 10 and send to the UA 130 the PDCP SNs 1, 2, 3, 4, 5, 6, 7, 8, then the corresponding pair (PDCP_GAP_COUNTER, PDCP SN) may be configured such as in Table 1. The PDCP SN may indicate where the gap location is and the PDCP_GAP_COUNTER may indicate the size of the accumulated gap. The maximum value of the PDCP_GAP_COUNTER may be about equal to the maximum value of the PDCP SN, e.g., PDCP_GAP_COUNTER=mod(PDCP_GAP_COUNTER, MAX(PDCP SN)). It may be necessary to keep the same maximum gap size for both PDCP SN and PDCP' SN.

TABLE 1

| PDCP_GAP_COUNTER | PDCP SN |
|---|---|
| 1 | 3 |
| 2 | 6 |
| . | . |
| . | . |
| . | . |

Alternatively, if the PDCP PDUs are received by the RN 120 out of order, the RN 120 may maintain a mapping table between the PDCP SNs and the PDCP' SNs. The length of the mapping table may be related to the periodicity or frequency of a PDCP status report, which may be sent on the Un interface. For instance, the length of the mapping table may be reduced when the frequency of the PDCP status report is increased. Specifically, the mapping table may comprise a PDCP' SN that indicates the actual PDCP PDU sequence received by the RN 120 from the access node 110 and the actual PDCP PDU sequence sent from the RN 120 to the UA 130, such as in Table 2.

TABLE 2

| PDCP SN | PDCP' SN |
|---|---|
| 1 | 1 |
| 2 | 2 |
| 3 | 3 |
| 4 | 4 |
| 5 | 5 |
| 6 | 7 |
| 7 | 6 |
| 8 | 8 |
| 9 | 9 |
| 10 | 10 |

Further, the received continuous PDCP' SNs may be collapsed, which may reduce the length of the mapping table, such as in Table 3. In this case, a gap in PDCP SN (left column) may indicate an in-order reception in the PDCP' SN (right column) and not a transmission gap. Since the RLC layer may be responsible for in-sequence delivery at the PDCP layer, out-of-order delivery of PDCP PDUs at the PDCP layer may have a low probability.

TABLE 3

| PDCP SN | PDCP' SN |
|---|---|
| 1 | 1 |
| 5 | 5 |
| 6 | 7 |
| 7 | 5 |
| 8 | 8 |
| 10 | 10 |
| 11 | 12 |
| 12 | 11 |

Alternatively, the mapping table may only maintain out-of-order PDCP' SNs without in-order PDCP' SNs. For instance, the mapping table may comprise a pair (x,y), where x is a PDCP SN and y is the corresponding PDCP' SN. Specifically, x and y may be recorded if x is not equal to y or the difference between x and y is not known. Otherwise, x and y may not be registered in the mapping table to substantially reduce the length of the mapping table. Additionally, the RN 120 may maintain the PDCP_GAP_COUNTER to determine the offset between x and y.

In some embodiments, each radio bearer on the Un interface may carry a plurality of UA radio bearers. Accordingly, the PDCP and PDCP' may carry different data bearer traffic. The RN 120 may maintain a mapping table for each UA radio bearer. The RN 120 may receive a PDCP' PDU from the access node 110, determine which UA radio bearer is associated with the PDCP' PDU, and update accordingly the mapping table that corresponds to the same UA radio bearer. For example, the radio bearer on the Un interface may carry a first UA radio bearer (UA1) and a second UA radio bearer (UA2). The RN 120 may receive a plurality of PDCP' SNs, e.g., 1, 2, 3, 4, 5, 6, 7, 8, 9, 10, where 8 may be dropped or lost, 1, 4, 5, 6, 10 may correspond to UA1, and 2, 3, 7, 9 may correspond to UA2. Thus, the PDCP SNs may be mapped to the PCDP' SNs as shown in Table 4 for UA1 and Table 5 for UA2.

TABLE 4

| PDCP SN | PDCP' SN |
|---|---|
| 1 | 1 |
| 2 | 4 |
| 3 | 5 |
| 4 | 6 |
| 5 | 10 |

TABLE 5

| PDCP SN | PDCP' SN |
|---|---|
| 1 | 2 |
| 2 | 3 |
| 3 | 7 |
| 4 | 9 |

Since each radio bearer on the Un interface may carry a plurality of UA radio bearers, the RN 120 may be configured to identify which of the UA radio bearers is associated with each packet sent on the Un interface. Since the S1 path is terminated at the access node 110 and not the RN 120, the RN 120 may not be able to use a General Packet Radio Service (GPRS) Tunneling Protocol (GTP) tunneling for the S1 path to associate the packets with their corresponding UA radio bearer. In an embodiment, the RN 120 and the access node 110 may establish a logical flow identifier (ID) to identify each UA radio bearer on the Un interface. For instance, when a new UA radio bearer is added to the Un interface, the UA radio bearer may be mapped to a new logical flow ID. The new logical flow ID is communicated to the RN 120 by the access node 110 using signaling, such as RRC signaling. The mapping may be achieved by including a corresponding "logical flow ID" field to a PDCP header in each packet associated with the UA radio bearer.

Typically, in Release 8, the access node 110 may remove the PDCP' PDU from its buffer after transmitting the PDU to the RN 120, e.g., in RLC-UM mode, or receiving an acknowledgement from the RN 120, e.g., in RLC-AM mode. In an embodiment, the relay node 120 may be configured to send, for instance periodically, a PDCP status report to the access node 110 to inform the access node 110 of the data that has been transmitted to the UA 130 (by the RN 120) or the data that was received (and hence acknowledged) by the UA 130. The PDCP status report may be generated based on the synchronous PDCP SNs that are maintained in the mapping table at the RN 120. The RN 120 may generate the PDCP status report when the PDCP PDUs reach a predetermined number or after the RN 120 sends or receives a handover request or acknowledgement. Further, the PDCP status report may be transmitted periodically based on the buffer size allocated for PDCP data at the access node 110.

After sending the PDCP status report, the RN 120 may update the mapping table by removing the table entries that correspond to the PDCP status report. The access node 110 may receive the PDCP status report and use it to remove the acknowledged (ACKed) PDCP' PDUs from its buffer. As such, during relay handover, no redundant data forwarding from the RN 120 to the access node 110 may be needed. Additionally, redundant data forwarding may be avoided without any changes to the RLC protocol.

In the case of a single UA radio bearer on the Un interface, the PDCP status report may be based on Release 8 format or may be formatted differently. For instance, based on Release 8 format, the reported PDCP' SN may start from the first missing PDCP PDU or SDU. If there is at least one out-of-sequence PDCP' SDU stored, a bitmap field may be allocated. The bitmap field may have a length equal to about the round up of the next multiple of eight of the number of PDCP' SNs from and not including the first missing PDCP' SDU up to and including the last out-of-sequence PDCP SDU. The PDCP' SDUs that have not been received by the lower layers, and optionally the PDCP' SDUs that have not been decompressed successfully, may be indicated by zeros in the bitmap field. Other PDCP' SDUs may be indicated by ones in the bitmap field. Additionally, at least one more field may be used to indicate the most recent PDCP' PDU, e.g., $n^{th}$ PDCP' SDU, received by the UA 130. The PDCP status report may report all received PDCP' PDUs up to SN n for all UAs.

In the case of a plurality of UA radio bearers on the Un interface, a UA ID (or UE ID) may be added and associated with each PDCP' PDU in the PDCP status report to provide the access node 110 with information about the context of each UA 130 during relay handover. For instance, the access node 110 may receive information about which PDCP PDUs were received by which UA 130, and which PDCP' PDUs are mapped to the PDCP PDUs. Thus, when a handover is established, the access node 110 may be aware of the PDCP' PDUs that need to be sent to the reassigned UA 130 and the first PDCP SN in buffer to indicate data forwarding start. Alternatively, the RN 120 may send a periodic PDCP status report as described in the single radio bearer case above without using UA IDs. However, after the RN 120 is informed of a handover for a UA 130, the RN 120 may add the UA ID to the PDCP PDU entries in the report. Alternatively, after the RN 120 is informed of a handover for the UA 130, the RN 120 may inform the access node 110 which of the PDCP PDUs were received by the UA 130 and their corresponding PDCP' SNs.

In an embodiment, the access node 110 may perform early termination for relay transmission during the relay handover procedure. Accordingly, the access node 110 may stop sending traffic to the relay node along the old S1 path, for instance after sending or detecting a handover request in the Release 8 handover procedure, which may reduce redundant data forwarding and convoluted data handling, as explained above. The access node 110 may then begin storing packets in the buffer, which may then be forwarded to the reassigned UA, for instance after sending or detecting a handover request acknowledgement at the access node 110.

Figure 9:
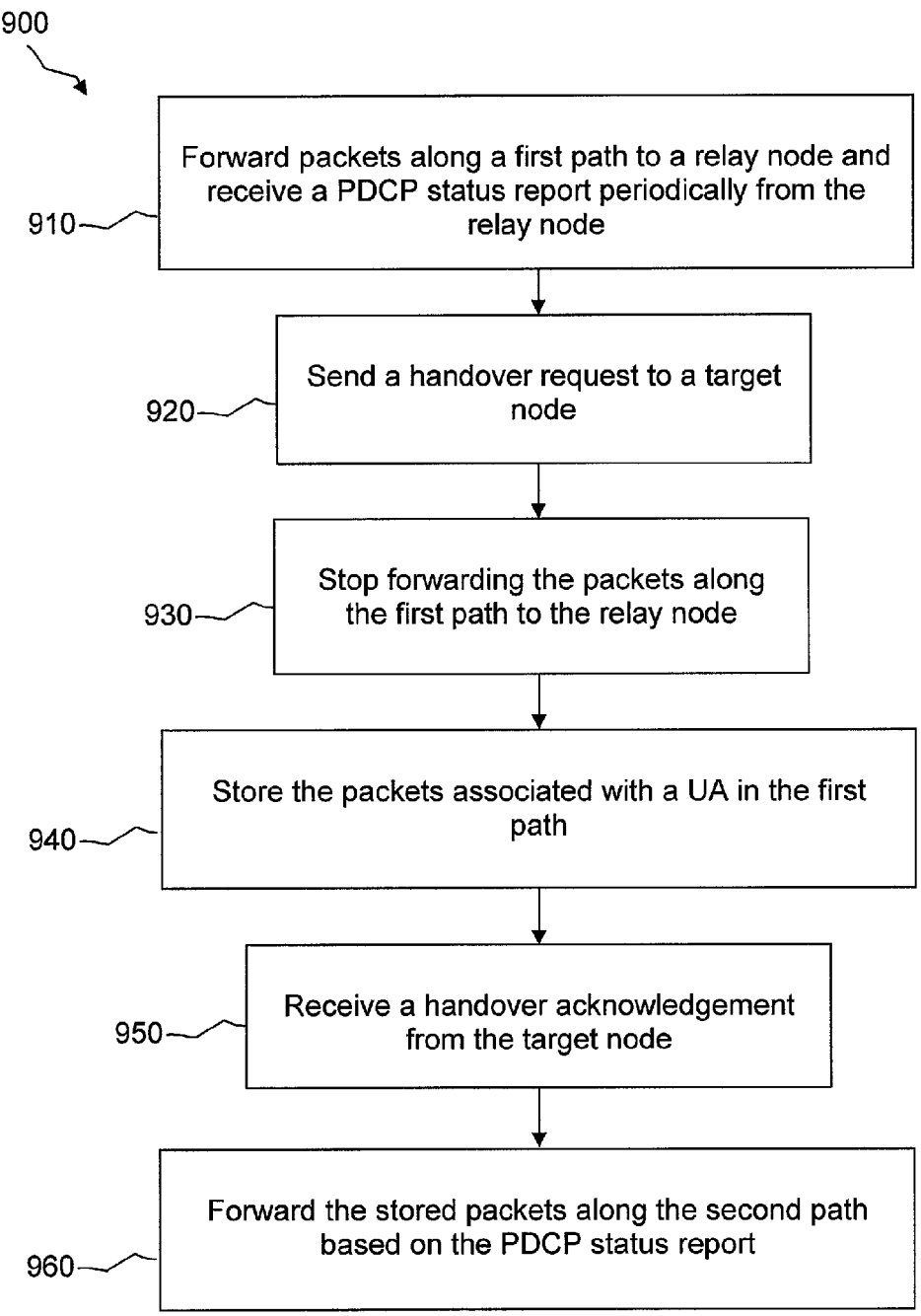
FIG. 9 is a flowchart of a method for handover data handling and forwarding according to an embodiment of the disclosure.

FIG. 9 illustrates an example flow of the handover data handling and forwarding method 900, which may be implemented during a relay handover for a UA by a source node. The source node may be a first access node that terminates a first path and communicates with a relay node initially assigned to the UA. At block 910, the source node may forward the packets received along the first path and receive a PDCP status report periodically from the relay node. At block 920, the source node may send a relay-initiated handover request to a target node, which may be a second access node or relay node along a second path, to reassign the UA to the target node. At block 930, the source node may stop forwarding packets addressed to the relay node along the first path. At block 940, the source node may store the packets associated with the UA. At block 950, the source node may receive a handover acknowledgement from the target node. At block 960, the source node may forward the stored packets along the second path based on the PDCP status report information.

Figure 10:
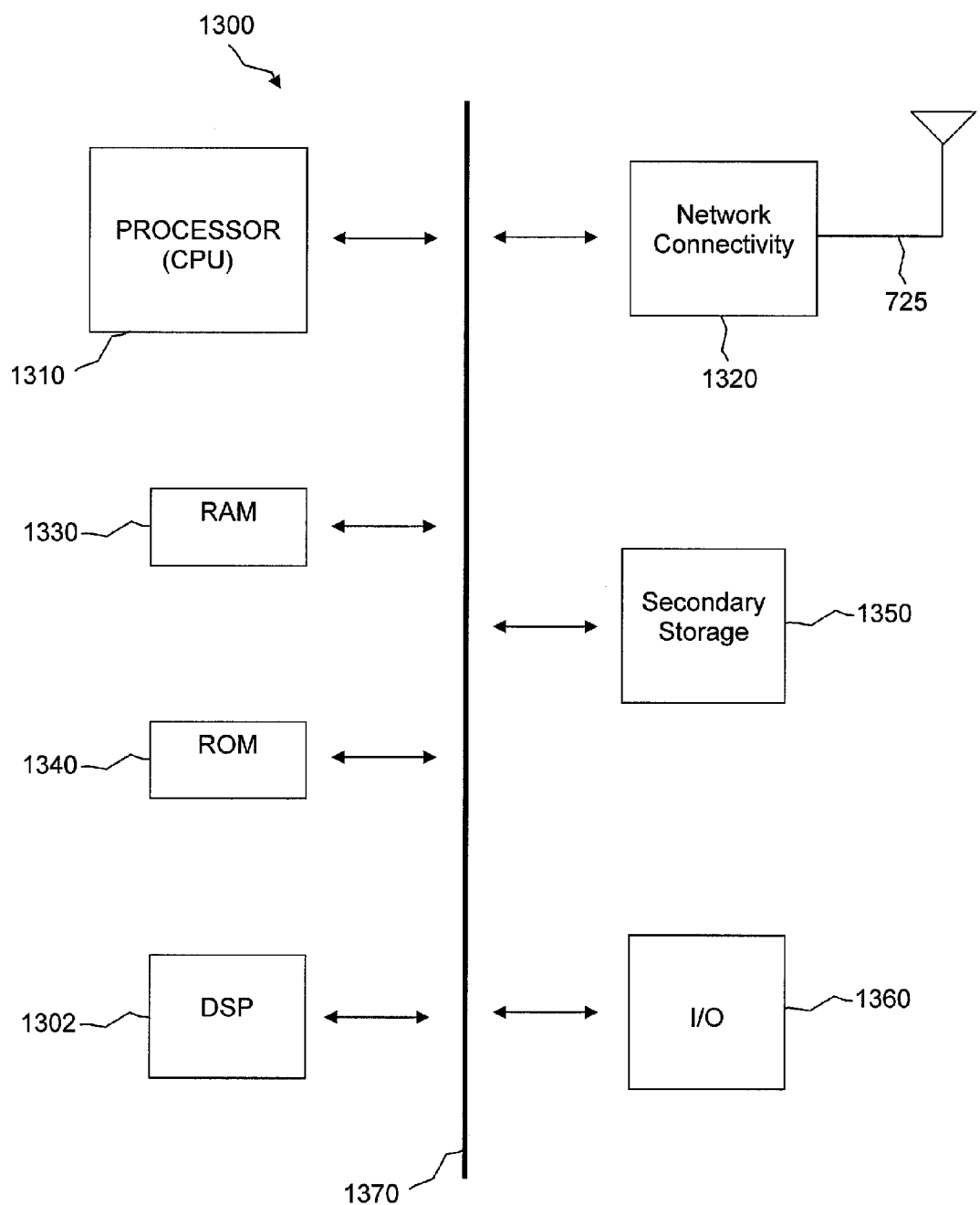
FIG. 10 illustrates a processor and related components suitable for implementing the several embodiments of the present disclosure.

The UA 130 and other components described above might include a processing component that is capable of executing instructions related to the actions described above. FIG. 10 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1302. Although the DSP 1302 is shown as a separate component, the DSP 1302 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

Various combinations of the components of the system 1300, including memory, hardware, firmware, software or others may be referred to herein as a "component".

The following are incorporated herein by reference for all purposes: 3GPP TS 36.814, 3GPP TS 36.304, and 3GPP TS 36.331.

In an embodiment, an access node is provided comprising at least one component configured to support forwarding of data packets to a user agent connected to a relay node, wherein the relay node is connected to the access node, and wherein the access node is a termination point for a first tunneling path from a core network.

In another embodiment, a relay node is provided comprising at least one component configured to support receiving data packets forwarded from an access node, and configured to support transmitting the data packets to a user agent, wherein the access node is a termination point for a first tunneling path from a core network.

In another embodiment, a method in a relay node is provided. The method includes the relay node receiving data packets forwarded from an access node. The method further includes the relay node transmitting the data packets to a user agent, wherein the access node is a termination point for a first tunneling path from a core network.

In another embodiment, an access node is provided comprising at least one component configured to support a handover of a user agent connected to a relay node, wherein the relay node is connected to the access node, and wherein the access node is a termination point for a S1 path from a core network, and wherein the handover includes an early termination of packet transmission from the access node to the relay node.

In another embodiment, a method in an access node is provided. The method includes the access node supporting a handover of a user agent connected to a relay node, wherein the relay node is connected to the access node, and wherein the access node is a termination point for a S1 path from a core network, and wherein the handover includes an early termination of packet transmission from the access node to the relay node.

In any of the above embodiments, the forwarding of data packets might include a PDCP status report sent from the relay node to the access node, and the PDCP status report might include information related to a first set of PDCP SNs corresponding to a second set of PDCP packets that have been successfully transmitted to the user agent.

Also, in any of the above embodiments, the access node or the relay node might support a handover of the user agent to another relay node or to the access node or to another access node using an early relay transmission termination.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An access node, comprising:
   at least one component configured to support forwarding of data packets to a user agent connected to a relay node, wherein the relay node is connected to the access node, and wherein the access node is a termination point for a first tunneling path from a core network,
   wherein the access node is configured to receive a message from the relay node indicating whether one or more of the data packets have been successfully transmitted to the user agent,
   wherein the access node forwards the data packets to the user agent via the relay node using a mapping of sequence numbers (SNs) of data packets transported on a Un interface between the access node and the relay node to SNs of data packets transported on a Uu interface between the relay node and the user agent, wherein the data packets are transported on the Un interface using a first Packet Data Convergence Protocol (PDCP) with SNs corresponding to a first set of PDCP SNs, and wherein the data packets are transported on the Uu interface using a second PDCP with SNs corresponding to a second set of PDCP SNs, wherein the PDCP SNs are mapped using a mapping table comprising at least one counter which indicates the number of consecutive first PDCP packets not successfully transmitted to the user agent on the Uu interface and a corresponding first PDCP SN where the count of the consecutive first PDCP packets starts.

2. The access node of claim 1, wherein a radio bearer on the Un interface carries a user agent radio bearer, and wherein the PDCP on the Uu interface and the PDCP on the Un interface carry a same radio bearer traffic.

3. The access node of claim 1, wherein a radio bearer on the Un interface carries a plurality of user agent radio bearers, and wherein the PDCP on the Uu interface and the PDCP on the Un interface carry different traffic.

4. The access node of claim 3, wherein data corresponding to each of the user agent radio bearers is mapped using a logic flow identifier (ID) to the corresponding user agent radio bearer.

5. A relay node, comprising:
at least one component configured to support receiving data packets forwarded from an access node, and configured to support transmitting the data packets to a user agent, wherein the access node is a termination point for a first tunneling path from a core network, wherein the relay node is configured to send a message informing the access node whether one or more of the data packets have been successfully transmitted to the user agent, wherein sequence numbers (SNs) of the data packets received from the access node on the Un interface between the access node and the relay node are mapped to SNs of data packets transmitted to the user agent on a Uu interface between the relay node and the user agent, wherein the data packets are received on the Un interface using a first Packet Data Convergence Protocol (PDCP) with SNs corresponding to a first set of PDCP SNs, and wherein the data packets are transmitted on the Uu interface using a second PDCP with SNs corresponding to a second set of PDCP SNs, wherein the PDCP SNs are mapped using a mapping table comprising at least one counter which indicates the number of consecutive first PDCP packets not successfully transmitted to the user agent on the Uu interface and a corresponding first PDCP SN where the count of the consecutive first PDCP packets starts.

6. The relay node of claim 5, wherein a radio bearer on the Un interface carries a user agent radio bearer, and wherein the PDCP on the Uu interface and the PDCP on the Un interface carry a same radio bearer traffic.

7. The relay node of claim 5, wherein a radio bearer on the Un interface carries a plurality of user agent radio bearers, and wherein the PDCP on the Uu interface and the PDCP on the Un interface carry different traffic.

8. The relay node of claim 7, wherein data corresponding to each of the user agent radio bearers is mapped using a logic flow identifier (ID) to the corresponding user agent radio bearer.

9. A method in a relay node, comprising:
the relay node receiving data packets forwarded from an access node;
the relay node transmitting the data packets to a user agent, wherein the access node is a termination point for a first tunneling path from a core network; and
the relay node sending a message informing the access node whether one or more of the data packets have been successfully transmitted to the user agent, wherein sequence numbers (SNs) of the data packets received from the access node on the Un interface between the access node and the relay node are mapped to SNs of data packets transmitted to the user agent on a Uu interface between the relay node and the user agent, wherein the data packets are received on the Un interface using a first Packet Data Convergence Protocol (PDCP) with SNs corresponding to a first set of PDCP SNs, and wherein the data packets are transmitted on the Uu interface using a second PDCP with SNs corresponding to a second set of PDCP SNs, wherein the PDCP SNs are mapped using a mapping table comprising at least one counter which indicates the number of consecutive first PDCP packets not successfully transmitted to the user agent on the Uu interface and a corresponding first PDCP SN where the count of the consecutive first PDCP packets starts.

10. The method of claim 9, wherein a radio bearer on the Un interface carries a user agent radio bearer, and wherein the PDCP on the Uu interface and the PDCP on the Un interface carry a same radio bearer traffic.

11. The method of claim 9, wherein a radio bearer on the Un interface carries a plurality of user agent radio bearers, and wherein the PDCP on the Uu interface and the PDCP on the Un interface carry different traffic.

12. The method of claim 11, wherein data corresponding to each of the user agent radio bearers is mapped using a logic flow identifier (ID) to the corresponding user agent radio bearer.

* * * * *

UNITED STATES PATENT AND TRADEMARK OFFICE
CERTIFICATE OF CORRECTION

PATENT NO.      : 8,594,094 B2           Page 1 of 1
APPLICATION NO. : 12/819139
DATED           : November 26, 2013
INVENTOR(S)     : Rose Qingyang Hu et al.

It is certified that error appears in the above-identified patent and that said Letters Patent is hereby corrected as shown below:

In the Claims:

Claim 5, Column 13, Line 40, replace "on the Un interface" with -- "on a Un interface" --

Claim 9, Column 14, Line 25, replace "on the Un interface" with -- "on a Un interface" --

Signed and Sealed this
Eleventh Day of February, 2014

Michelle K. Lee
*Deputy Director of the United States Patent and Trademark Office*